United States Patent [19]

Klaue

[11] Patent Number: 5,418,399
[45] Date of Patent: May 23, 1995

[54] ENGINE/GENERATOR SET ESPECIALLY FOR A MOTOR VEHICLE

[76] Inventor: Hermann Klaue, Case Postale 1344, CH-1820 Montreux, Switzerland

[21] Appl. No.: 187,191

[22] Filed: Jan. 25, 1994

[51] Int. Cl.⁶ .......................... F02B 63/04; H02K 7/18
[52] U.S. Cl. ..................................... 290/1 R; 60/607; 60/613; 123/65 R; 290/45
[58] Field of Search ............. 60/607, 613; 123/56 BC, 123/65 R; 290/1 R, 16, 45

[56] References Cited

U.S. PATENT DOCUMENTS

| | | | |
|---|---|---|---|
| 3,510,703 | 5/1970 | Klaue | 290/1 R |
| 3,650,345 | 3/1972 | Yardney | 290/16 |
| 4,050,536 | 9/1977 | Pristash | 60/613 |
| 4,989,410 | 2/1991 | Smith | 60/607 |
| 5,148,778 | 9/1992 | Klaue | 123/65 R |

FOREIGN PATENT DOCUMENTS 3539069  4/1993  Germany .

Primary Examiner—A. D. Pellinen
Assistant Examiner—Robert Lloyd Hoover
Attorney, Agent, or Firm—Herbert Dubno

[57] ABSTRACT

An engine/generator set, especially for use in driving a hybrid motor vehicle, in which an internal combustion engine is equipped with free flying pistons. The internal combustion engine operates in a two-stroke cycle with asymmetrical electrically controlled gas exchange with an exhaust gas turbine driving a turbocompressor. The power excess is fed back via a synchronous alternating current machine to the generator so that the vehicle is driven with high efficiency with an apparatus of reduced volume and weight per unit output.

19 Claims, 7 Drawing Sheets

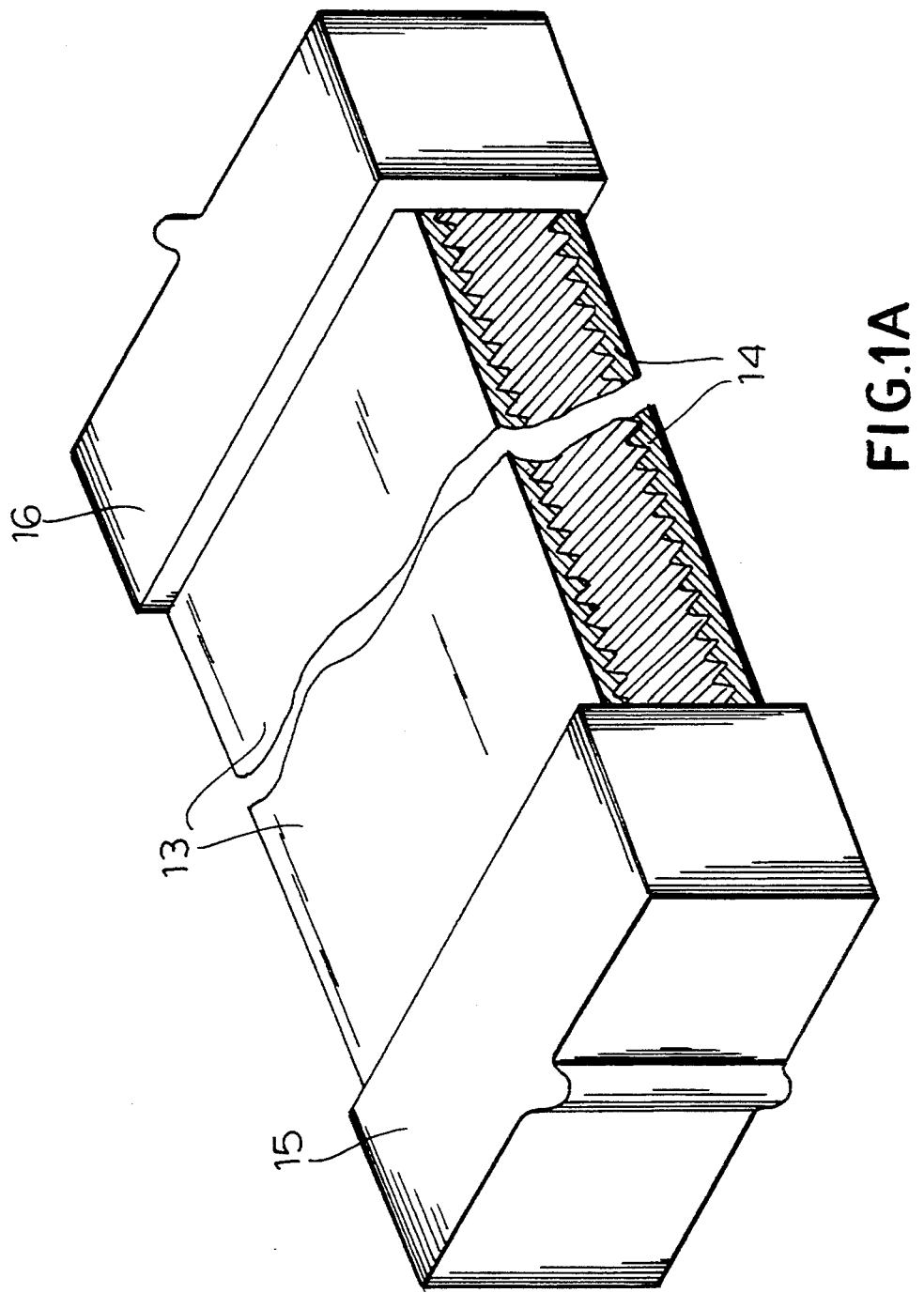

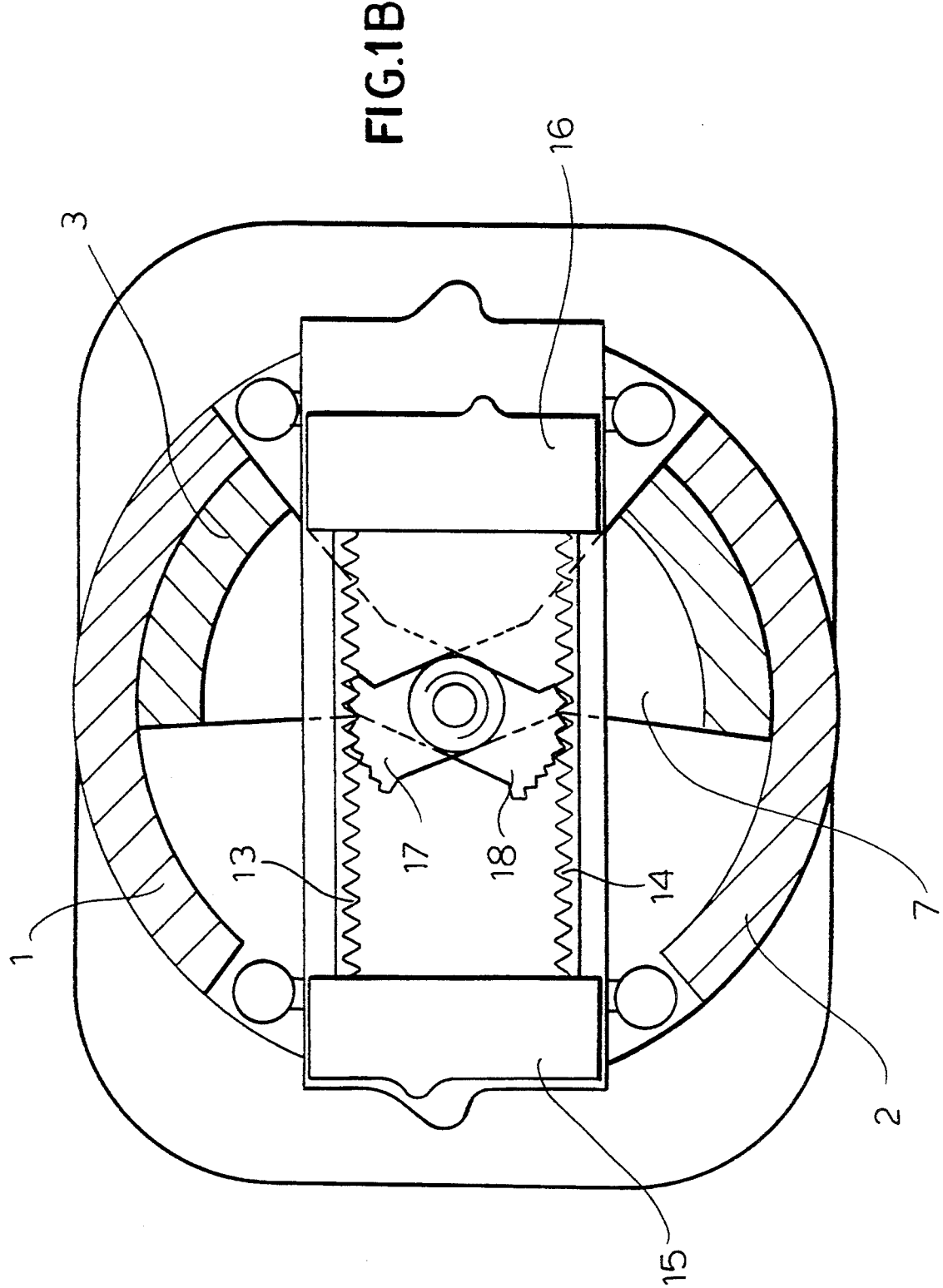

ENGINE/GENERATOR SET ESPECIALLY FOR A MOTOR VEHICLE

FIELD OF THE INVENTION

The present invention relates to an engine/generator set, especially for use as a motor-vehicle drive and, more particularly, to an electric drive system for a motor vehicle utilizing an internal combustion engine with free flying pistons to propel the electric generator.

BACKGROUND OF THE INVENTION

Since the steam engines of the 1800's, automotive vehicles have been driven with crank systems tending to lose about a quarter of the driving energy. This problem was recognized by Lenoir and later by Oechelhäuser and Junkers who proposed the use of flying piston internal combustion engines.

From a mechanical viewpoint, however, the longitudinal energy of the flying pistons was partly lost in the conversion of this energy to the rotation energy required for the remainder of the vehicle drive. As a consequence, the earlier flying piston systems did fully not eliminate the losses of crank drives.

U.S. Pat. No. 3,510,703 discloses a system in which the mechanical energy of a fly piston internal-combustion engine is converted into electrical energy utilizing a longitudinally actuated generator and the electrical energy is then employed to operate the wheel-drive motors of a vehicle. When this system is applied as a truck drive the dimensions of the electrical part between the pistons were excessive, leading to an overall length of the apparatus which was more than desirable and a weight per unit of power output which was considerable as well.

Another disadvantage of this type of generator was that the mechanical flux exchange between the stator and the linearly displaceable armature was longitudinal rather than rotational or radially oscillating which led to a reduced efficiency.

Efforts to eliminate these drawbacks were made in German Patent 35 39 069 by providing a radially swinging generator part to opposite sides of a pair of pistons of the internal combustion machine connected by racks. It should be noted that, by comparison with machines whose pistons can be subjected to the expansion force of the exploding fuel only at one side, flying piston machines which can be fired at opposite sides of the piston assembly can have an increase in overall efficiency by some 25 to 30%.

OBJECTS OF THE INVENTION

It is therefore an object of the present invention to provide an engine/generator set, especially for use as a motor vehicle drive, which has increased efficiency by comparison with earlier drive systems.

Another object of this invention is to provide an improved engine/generator set with fewer drawbacks of conventional vehicle drive systems.

Still another object is the invention is to provide a low weight, high output, easily constructed and maintained engine/generator set for an automotive vehicle whereby drawbacks of earlier systems are obviated.

SUMMARY OF THE INVENTION

These objects and others which will become apparent hereinafter are attained, in accordance with the present invention by providing an engine/generator set which comprises at least one pair of free flying pistons, i.e. pistons linearly driven in opposite directions by firing alternately at opposite ends thereof, preferably operating in a two-stroke engine cycle, which are connected between them to rotor segments angularly oscillated by the reciprocating movement of the free flying pistons relative to a stator to generate an alternating current in the stator which is utilized to drive the vehicle.

The segments may be angularly oscillated about the axis of a hollow shaft on which the segments are carried and can be coupled to the pistons by tooth segments, levers or links. For the gas exchange in the engine, a throughgoing shaft is provided along the axis and hence through the hollow shaft or shafts of the rotor segments. This throughgoing shaft is provided at one end with a drive turbine driven by the exhaust gases and is provided at the opposite end with a compressor turbine, i.e. a turbocompressor. As a result, a highly compact configuration is ensured.

The central shaft can be connected by a step-down transmission with a synchronous alternating current machine which is disposed centrally with respect to the central shaft and whose stator winding is connected to that of the generator and which is dimensioned to make one revolution per back and forth movement of the rotor segments of the generator and which provides via gears a synchronous control of rotary slide valves affording communication with the cylinder, thereby synchronizing these valves with the movement of the pistons.

It has been found to be advantageous to provide the pistons and the cylinder of the internal combustion engine so that they are of rectangular shape, whereby the sealing ribs of the piston can pass over the slits affording gas exchange without wear and with improved efficiency over cylindrical configurations of the cylinder and piston. The slits and the rotary valves provide exceptionally small dead spaces in conjunction with the piston surfaces in the cylinder.

According to a further feature of the invention, the internal combustion engine is an autoignition engine in which each piston has a rounded rib cooperating with a cylindrical combustion chamber in the cylinder head and into which the fuel is injected centrally upon compression by the piston.

More particularly, an engine generator set for use in a motor vehicle drive can comprise:
- an internal-combustion engine having at least one cylinder and a pair of free-flying pistons reciprocatable in the cylinder;
- at least one hollow shaft extending generally through a middle of the cylinder;
- an electric-current generator having a pair of counter-rotating angularly oscillatable exciting rotor segments pivotable mounted on the at least one hollow shaft and operatively connected to the free-flying pistons for displacement in opposite angular senses thereby, and a stator juxtaposed with the segments for producing an alternating current with a frequency determined by a cadence of oscillation of the segments;
- a central shaft extending continuously through the hollow shaft from one end of the engine/generator set to an opposite end thereof;
- a turbocompressor at one of the ends having a compressor rotor connected to the central shaft for compressing air to be fed to the cylinder; and an exhaust-gas turbine driven by exhaust gas from the cylinder at the other of the ends and having a turbine rotor connected to the central shaft.

The apparatus can thus also have:
a step-down transmission connected to the central shaft;
a synchronous alternating-current machine having a stator connected to the stator of the generator, and a rotor dimensioned for one rotation for each back and forth movement of the rotor segments of the generator; and
rotary valves for admitting air under pressure from the turbocompressor to the cylinders and discharging exhaust gas therefrom and controlled by the rotor of the synchronous alternating-current machine.

According to a feature of the invention, the exhaust-gas turbine and the synchronous alternating-current machine are so dimensioned that below a predetermined engine load excess energy of the exhaust gas is transferred to the synchronous alternating-current machine via the central shaft and the transmission and, by the alternating-current machine, to the generator.

The engine is preferably an autoigniting engine and the pistons have rounded ribs cooperating with semicylindrical recesses in respective cylinder heads of the cylinder to generate intensive air flows in a compression stroke of the pistons, the engine further comprising means for injecting fuel into centers of the intensive air flows.

BRIEF DESCRIPTION OF THE DRAWING

The above and other objects, features and advantages of the invention will become more readily apparent from the following description, reference being made to the accompanying highly diagrammatic drawing in which:

FIG. 1A is a perspective view of the piston assembly.

FIG. 1B is a cross-sectional view through the piston assembly and the segments connected thereto.

SPECIFIC DESCRIPTION

Figure 7:
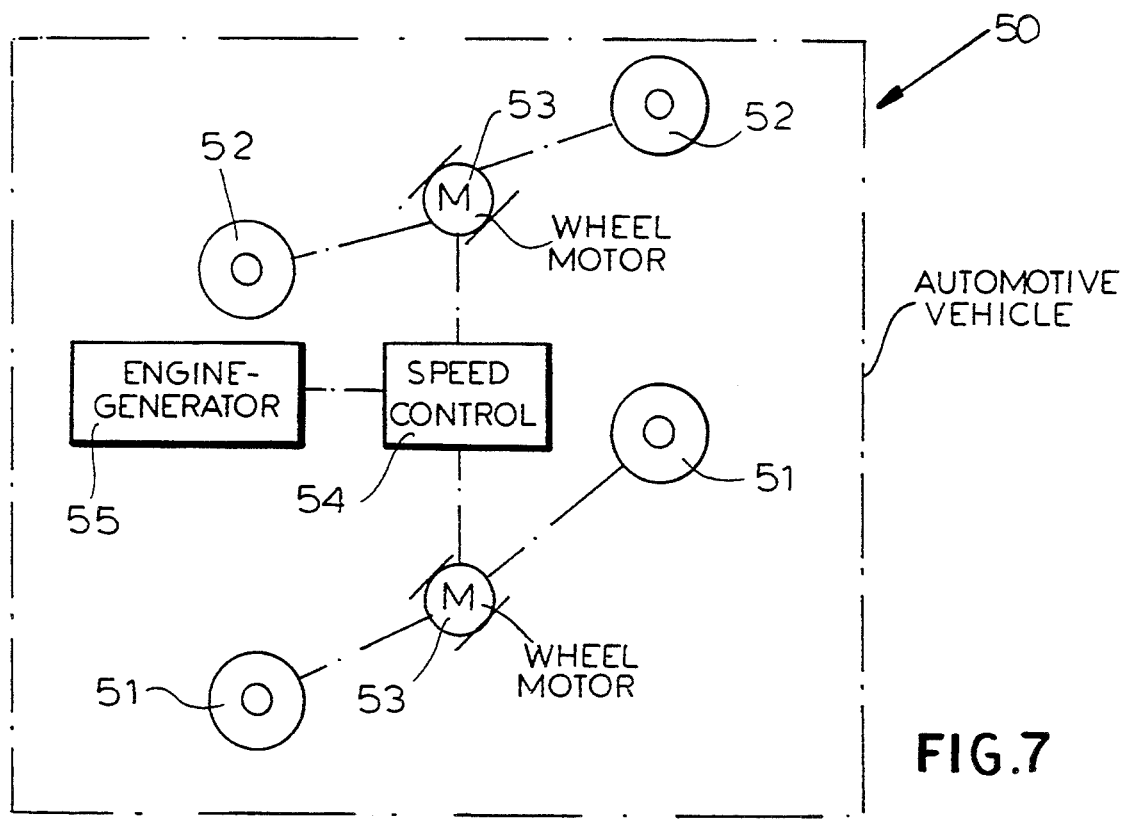
FIG. 7 is a diagram of principal parts of a motor vehicle embodying the engine generator set of FIGS. 1 and 2.

Turning first to FIG. 7, it can be seen that a motor vehicle generally represented at 50 can comprise wheels 51 and 52 driven by wheel motors 53 which are electrically energized by a speed control 54. The power for the wheel motors is supplied by an engine/generator set 55 which can, according to this invention, be the engine generator set shown in FIGS. 1 and 2.

Figure 1:
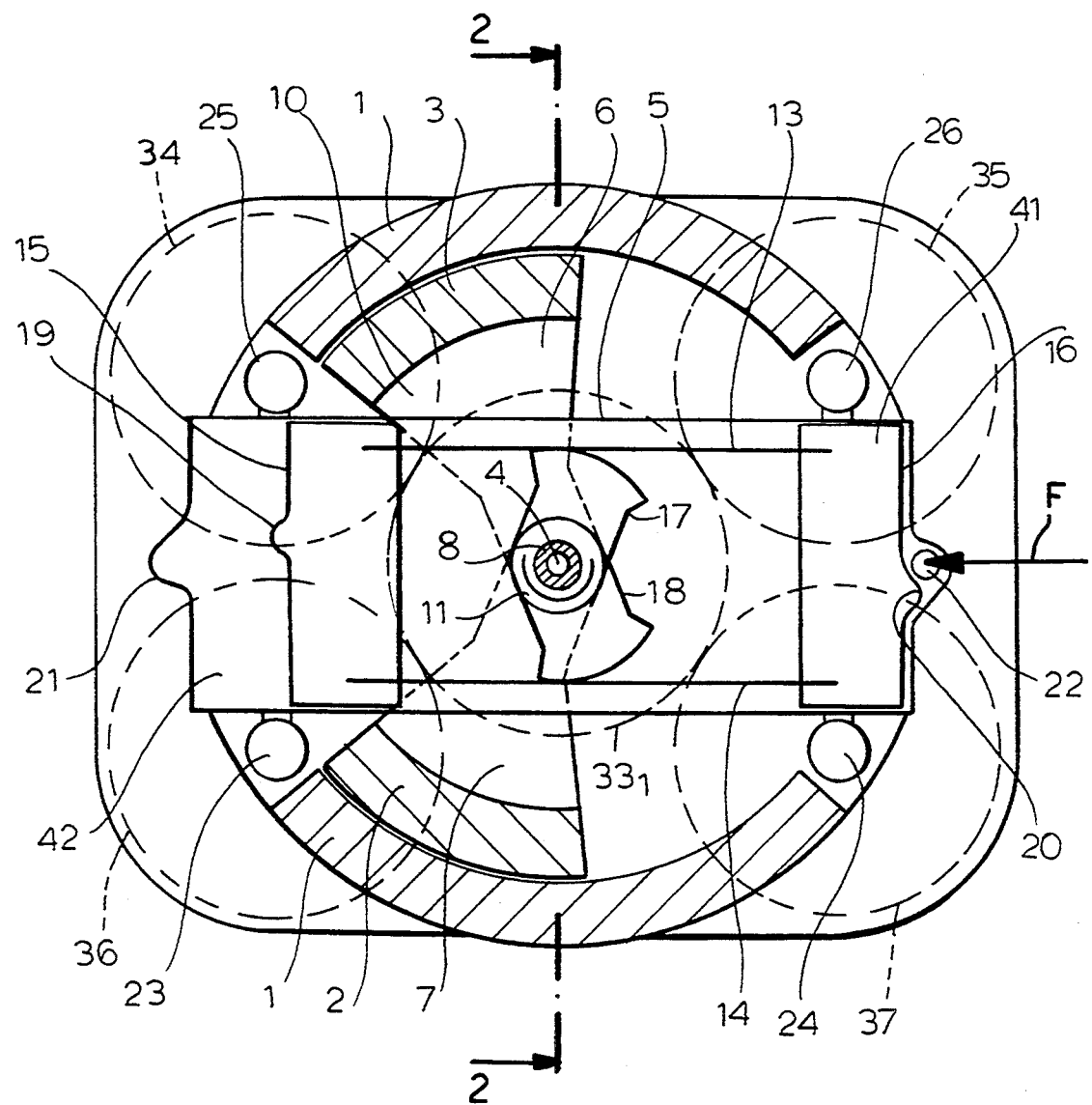
FIG. 1 is a cross sectional view through an engine generator set according to the invention and taken generally along the line 1—1 of FIG. 2.
Figure 2:
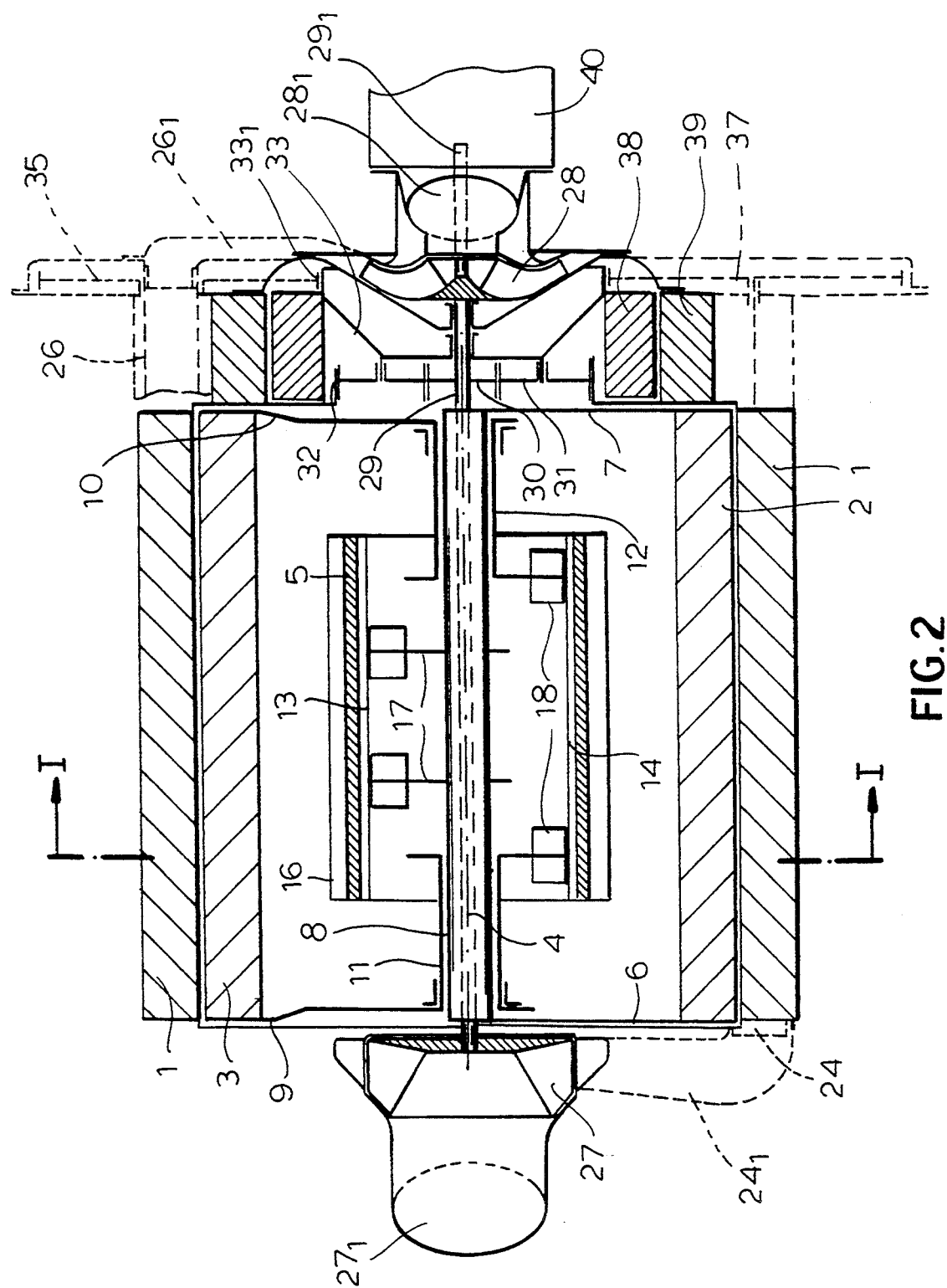
FIG. 2 is a longitudinal section taken generally along the line 2—2 of FIG. 1.
Figure 8:
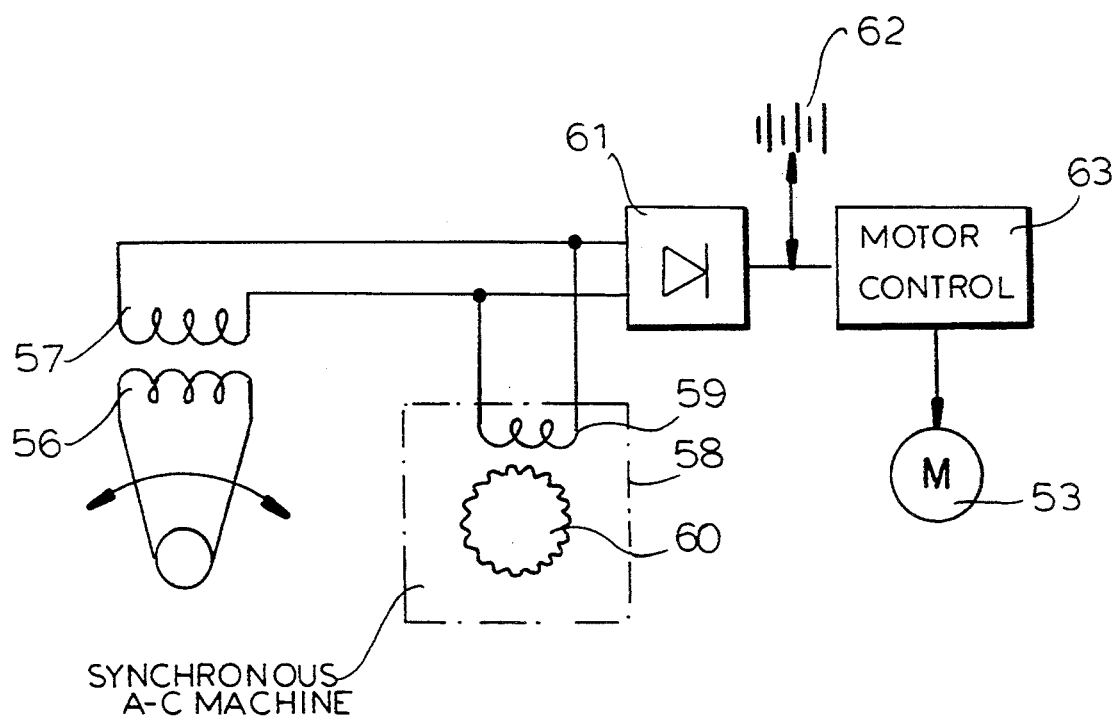
FIG. 8 is a circuit diagram illustrating another aspect of the invention.

From the electrical point of view, the angularly oscillatable rotor segments 2 and 3 to be described can carry coils 56 which are excitable or even permanent magnets and cooperate with the coils 57, shown at FIG. 8, of a stator winding 1 shown only diagrammatically in FIGS. 1 and 2.

The synchronous alternating current machine to be described at 38, 39 in connection with FIGS. 1 and 2, is represented in FIG. 8 by the machine 58 and is capable of operating selectively as a motor or as a generator and has its stator winding 59 connected to the stator winding 57 of the engine generator set while its armature 60 is connected to the central shaft via a transmission as will be discussed.

The alternating current output of the generator can be rectified at 61 and supplied to a battery 62 and the motor control 63 for operating the wheel motors which in FIG. 8 are represented collectively at 53.

Turning now to FIGS. 1 through 5, it can be seen that the stator 1 of the generator has an inner cylindrical configuration within which the rotor segments 2 and 3 are angularly oscillatable in opposite senses upon reciprocation of the pair of pistons 15, 16 to induce an alternating current in the stator winding 1. The rotor segments 2 and 3 oscillate about a pivot axis 4 forming the central axis of the stator and passing centrally through the rectangular cross section cylinder 5 in which the pistons 15 and 16 reciprocate on opposite sides of the axis 4.

The rotor segment 2 is connected by pivot arms 6 and 7 with the hollow pivot shaft 8 and the rotor segment 3 is connected via pivot arms 9 and 10 with the hollow shafts 11 and 12 which are coaxial with and surround the hollow shaft 8.

The hollow shafts 11 and 12 are connected by plates 13 and 14 formed with teeth meshing with toothed segments 17 and 18 of the rotor segments 2 and 3, also swing in opposite senses and constituting counter weights for the rotor segments 2 and 3 to balance the swinging masses on opposite sides of the axis 4. In other words, as the free flying pistons 15 and 16 reciprocate linearly back and forth, via the toothed plates 13 and 14 which couple the pistons together, the segments 2 and 3 are angularly oscillated with respect to the stator winding to induce the alternating current therein.

The internal combustion engine operates in a two-stroke cycle in accordance with the diesel process or via autoignition, i.e. firing in each chamber upon compression of the air therein by injection of the fuel.

For this purpose, each of the cylinder heads is formed with a semicylindrical chamber or recess 21 or 22 into which the semicylindrical or rounded ribs 19 and 20 on the respective pistons 15 and 16 can engage during the respective compression stroke to provide an intensive air vortex between the rib and the recess wall into which the fuel is injected centrally. The fuel injection means is represented by the arrow F in FIG. 1.

Figure 6:
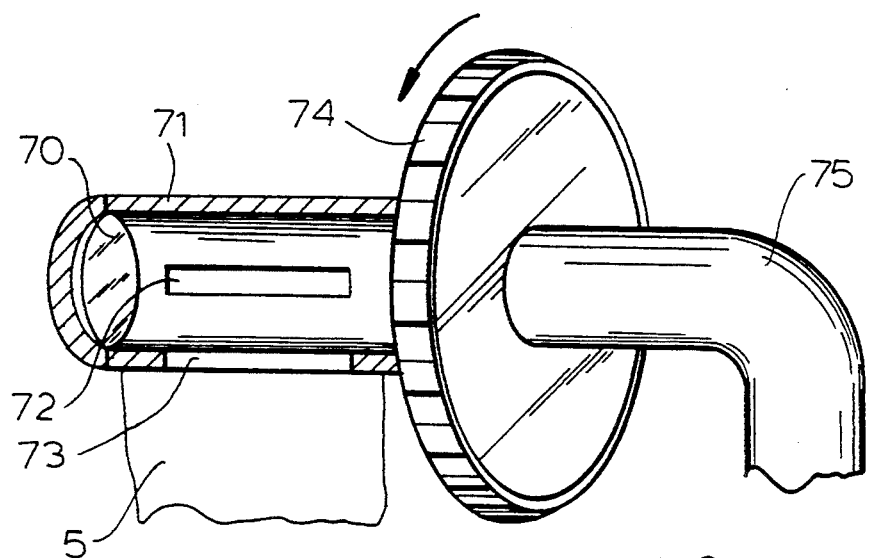
FIG. 6 is a perspective view showing a rotary slide valve according to the invention.

The gas exchange in the working chambers 41 and 42 of the cylinder utilizes rotary valves 23 through 26 which can also be referred to as rotary operated valves (see FIG. 6). Each of these valves can include a hollow sleeve 70 which slides angularly in a respective cylindrical housing 71 and is formed with a slit 72 which, at the proper phase in the timing, registers with a slit 73 in a corresponding wall of the rectangular cylinder 5 to either admit the compressed air to the cylinder or to discharge the combustion product in the form of an exhaust gas mixture therefrom. Each sleeve 70 is rotated by a gear wheel generically represented at 74 in FIG. 6 and communicates with a duct generically represented at 75 in FIG. 6 but shown in greater detail for the exhaust and intake ducts in FIGS. 3 and 4.

The gears 34 through 37 of the rotary valves 23 through 26 are driven by a central gear 33.

For this purpose, the engine/generator set is provided with the alternating current synchronous machine 38, 39, now operating as a motor, previously mentioned and whose stator winding 39 is connected to the stator winding 1 so that for each back and forth movement of the rotor segments 2 and 3 a single rotation of the rotor 38, operating with stator 39 in a motor mode, of the machine 38, 39 is thereby effected. Thus at a frequency of 50 Hz, of the generator 1 to 3, armature 38 runs at 3000 RPM. The armature 38 is connected to planetary gearing 30 to 32.

The sun gear 30 of the planetary gearing is connected to the shaft 29 which drives the turbocharger or turbine 28 for supplying compressed air to the cylinder 5 via the rotary valves 23 and 26 and which, in turn, is driven by the turbine 27 of the exhaust gas system receiving exhaust gas via the valves 24 and 25. The turbine 27 thus serves to transform the energy of the exhaust gas into the driving force for the turbocompressor and any excess energy is converted into electricity in the synchronous alternating machine 38, 39 and supplied to the generator thereby.

The planet gears 31 mesh with the central or sun gear 30 and are carried by a planet carrier 33 which is connected with the armature 38 of the synchronous alternating current machine. The planet gears also mesh with a ring gear 32 connected to the stationary stator 1. The planetary gear transmission has a transmission ratio 1 to 10 so that with a generator frequency of 50 Hz, the armature 38 is driven at 3000 RPM and the turbocharger and exhaust gas turbine at 30,000 RPM.

Figure 3:
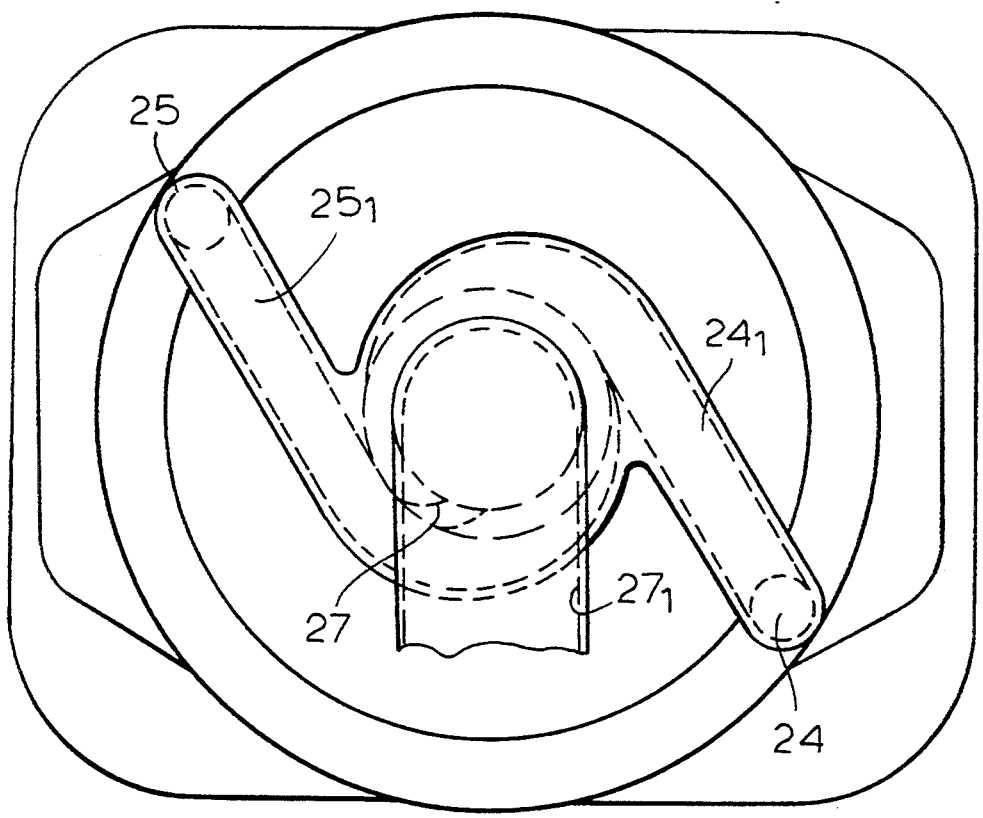
FIG. 3 is an end view at the discharge side of the apparatus showing the exhaust gas passages.
Figure 4:
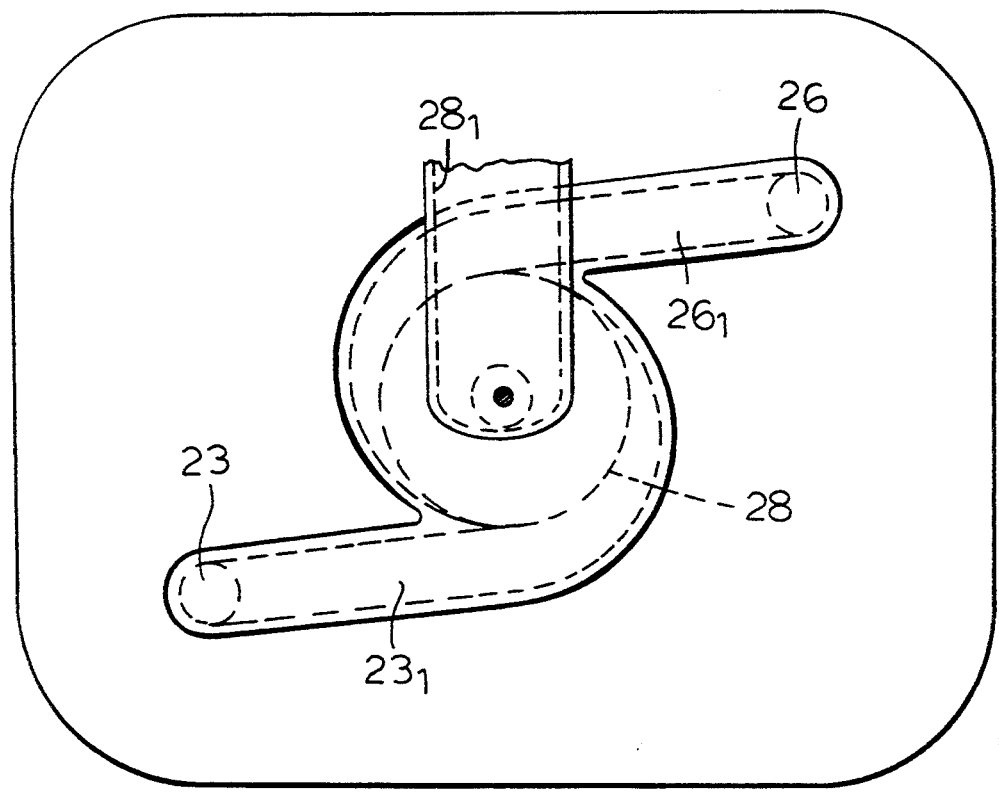
FIG. 4 is an end view at the intake side of the machine showing the air inlet passages.
Figure 5:
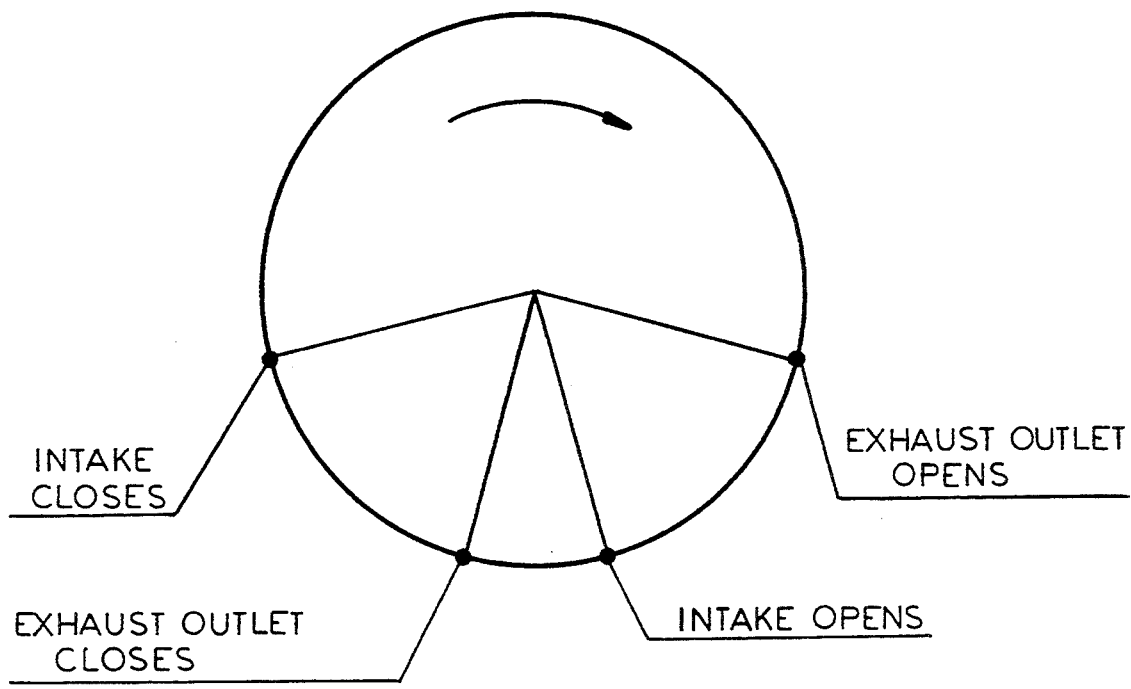
FIG. 5 is a diagram of the gas exchange conditions in operation of the engine.

From FIG. 3 the connections between the outlet valves 24 and 25 and the exhaust gas turbine 27 can be seen to include the gas ducts $24_1$ and $25_1$. FIG. 4 shows the connection between the turbocharger 28 and the rotary valves 23 and 26 to be effected by the gas ducts $23_1$ and $26_1$. Via the duct $27_1$, the expanded exhaust gas is discharged to the muffler and the exhaust pipe while the setting $28_1$ supplies air to the turbocharger. FIG. 5 shows the timing diagram for the asymmetrical material exchange.

For starting the engine/generator set, center shaft 29 is provided with a stub $29_1$ which can be driven by a starter 40 energized with direct current from the battery 62 and via an overrunning clutch as is conventional. The alternating current machine 38, 39 and the generators 1 to 3 are simultaneously excited by the battery current via, if desired, a convertor.

A weight and efficiency comparison between a 4 cylinder four-stroke diesel engine truck drive with a 50 KW generator output with the same power output as the present invention shows that the conventional drive is 18 to 25% heavier than the engine/generator set of the engine, including engine/transmission and axle drive. Because of the substantial elements of the crank drive and the improvements available from the use of a two-stroke diesel engine system with energy feedback at full engine load with the invention, the efficiency of the engine/generator system of the invention can be 45 to 48% while conventional drives do not operate above 32% efficiency.

It will be understood that, with the apparatus of the invention, when there is excess exhaust gas energy that is transmitted via the transmission 30 to 33 to the synchronous alternating current machine, 38, 39 which thus forms an auxiliary generator with its electrical output being supplied to the generator 1 to 3.

I claim:

1. A engine/generator set, especially for use as a motor-vehicle drive, comprising:
   an internal-combustion engine having at least one cylinder and a pair of free-flying pistons reciprocatable in said cylinder;
   at least one hollow shaft extending generally through a middle of said cylinder;
   an electric-current generator having a pair of counter-rotating angularly oscillatable exciting rotor segments pivotable mounted on said at least one hollow shaft and operatively connected to said free-flying pistons for displacement in opposite angular senses thereby, and a stator juxtaposed with said segments for producing an alternating current with a frequency determined by a cadence of oscillation of said segments;
   a central shaft extending continuously through said hollow shaft from one end of said engine/generator set to an opposite end thereof;
   a turbocompressor at one of said ends having a compressor rotor connected to said central shaft for compressing air to be fed to said cylinder;
   an exhaust-gas turbine driven by exhaust gas from said cylinder at the other of said ends and having a turbine rotor connected to said central shaft;
   a step-down transmission connected to said central shaft;
   a synchronous alternating-current machine having a stator connected to said stator of said generator, and a rotor dimensioned for one rotation for each back and forth movement of said rotor segments of said generator; and
   rotary valves for admitting air under pressure from said turbocompressor to said cylinders and discharging exhaust gas therefrom and controlled by said rotor of said synchronous alternating-current machine.

2. The engine/generator set defined in claim 1 wherein said exhaust-gas turbine and said synchronous alternating-current machine are so dimensioned that below a predetermined engine load excess energy of said exhaust gas is transferred to said synchronous alternating-current machine via said central shaft and said transmission and, by said alternating-current machine, to said generator.

3. The engine/generator set defined in claim 1 wherein said pistons and said cylinder of said engine have rectangular cross sections.

4. The engine/generator set defined in claim 1 wherein said engine is an autoigniting engine and said pistons have rounded ribs cooperating with semicylindrical recesses in respective cylinder heads of said cylinder to generate intensive air flows in a compression stroke of the pistons, said engine further comprising means for injecting fuel into centers of said intensive air flows.

5. The engine/generator set defined in claim 1 wherein said generator is connected to electric wheel-drive motors of an automotive vehicle.

6. The engine/generator set define in claim 5 wherein said pistons are connected with plates on opposite sides of said shafts.

7. The engine/generator set defined in claim 6 wherein said plates are toothed and each of said rotor segments is formed with a gear segment meshing with the teeth of a respective one of said plates.

8. The engine-generator set defined in claim 7, further comprising:
- a step-down transmission connected to said central shaft;
- a synchronous alternating-current machine having a stator connected to said stator of said generator, and a rotor dimensioned for one rotation for each back and forth movement of said rotor segments of said generator; and
- rotary slide valves for admitting air under pressure from said turbocompressor to said cylinders and discharging exhaust gas therefrom and controlled by said rotor of said synchronous alternating-current machine.

9. The engine/generator set defined in claim 8 wherein said step-down transmission is a planetary gear transmission.

10. The engine/generator set defined in claim 9 wherein said planetary gear transmission has a sun gear connected to said central shaft, a planet carrier rotatable mounted on said central shaft and operatively connected with said rotary slide valves, planet gears on said planet carrier meshing with said sun gear, and a ring gear connected with the stator of said generator and meshing with said planet gears.

11. The engine/generator set defined in claim 10 wherein said exhaust-gas turbine and said synchronous alternating-current machine are so dimensioned that below a predetermined engine load excess energy of said exhaust gas is transferred to said synchronous alternating-current machine via said central shaft and said transmission and, by said alternating-current machine, to said generator.

12. The engine/generator set defined in claim 11 wherein said pistons and said cylinder of said engine have rectangular cross sections.

13. The engine/generator set defined in claim 12 wherein said engine is an autoigniting engine and said pistons have rounded ribs cooperating with semicylindrical recesses in respective cylinder heads of said cylinder to generate intensive air flows in a compression stroke of the pistons, said engine further comprising means for injecting fuel into centers of said intensive air flows.

14. A engine/generator set, especially for use as a motor-vehicle drive, comprising:
- an internal-combustion engine having at least one cylinder and a pair of free-flying pistons reciprocatable in said cylinder;
- at least one hollow shaft extending generally through a middle of said cylinder;
- an electric-current generator having a pair of counter-rotating angularly oscillatable exciting rotor segments pivotable mounted on said at least one hollow shaft and operatively connected to said free-flying pistons for displacement in opposite angular senses thereby, and a stator juxtaposed with said segments for producing an alternating current with a frequency determined by a cadence of oscillation of said segments;
- a central shaft extending continuously through said hollow shaft from one end of said engine/generator set to an opposite end thereof;
- a turbocompressor at one of said ends having a compressor rotor connected to said central shaft for compressing air to be fed to said cylinder;
- an exhaust-gas turbine driven by exhaust gas from said cylinder at the other of said ends and having a turbine rotor connected to said central shaft;
- said generator being connected to electric wheel-drive motors of an automotive vehicle;
- said pistons being connected with plates on opposite sides of said shafts;
- said plates being toothed and each of said rotor segments being formed with a gear segment meshing with the teeth of a respective one of said plates;
- a step-down transmission connected to said central shaft;
- a synchronous alternating-current machine having a stator connected to said stator of said generator, and a rotor dimensioned for one rotation for each back and forth movement of said rotor segments of said generator; and
- rotary slide valves for admitting air under pressure from said turbocompressor to said cylinders and discharging exhaust gas therefrom and controlled by said rotor of said synchronous alternating-current machine.

15. The engine/generator set defined in claim 14 wherein said step-down transmission is a planetary gear transmission.

16. The engine/generator set defined in claim 15 wherein said planetary gear transmission has a sun gear connected to said central shaft, a planet carrier rotatable mounted on said central shaft and operatively connected with said rotary slide valves, planet gears on said planet carrier meshing with said sun gear, and a ring gear connected with the stator of said generator and meshing with said planet gears.

17. The engine/generator set defined in claim 16 wherein said exhaust-gas turbine and said synchronous alternating-current machine are so dimensioned that below a predetermined engine load excess energy of said exhaust gas is transferred to said synchronous alternating-current machine via said central shaft and said transmission and, by said alternating-current machine, to said generator.

18. The engine/generator set defined in claim 17 wherein said pistons and said cylinder of said engine have rectangular cross sections.

19. The engine/generator set defined in claim 18 wherein said engine is an autoigniting engine and said pistons have rounded ribs cooperating with semicylindrical recesses in respective cylinder heads of said cylinder to generate intensive air flows in a compression stroke of the pistons, said engine further comprising means for injecting fuel into centers of said intensive air flows.

* * * * *